United States Patent
Kim et al.

(10) Patent No.: US 9,398,548 B2
(45) Date of Patent: Jul. 19, 2016

(54) INTERFERENCE CONTROL METHOD IN WIRELESS COMMUNICATION SYSTEM AND APPARATUS FOR THE SAME

(71) Applicant: LG ELECTRONICS INC., Seoul (KR)

(72) Inventors: Kijun Kim, Anyang-si (KR); Jaewon Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 68 days.

(21) Appl. No.: 14/063,793

(22) Filed: Oct. 25, 2013

(65) Prior Publication Data

US 2014/0119332 A1    May 1, 2014

Related U.S. Application Data

(60) Provisional application No. 61/718,710, filed on Oct. 26, 2012.

(51) Int. Cl.
*H04W 52/58* (2009.01)
*H04W 52/24* (2009.01)
*H04L 5/00* (2006.01)

(52) U.S. Cl.
CPC ............ *H04W 52/58* (2013.01); *H04W 52/243* (2013.01); *H04L 5/0066* (2013.01)

(58) Field of Classification Search
None
See application file for complete search history.

(56) References Cited

U.S. PATENT DOCUMENTS

2014/0286291 A1    9/2014    Einhaus et al.

FOREIGN PATENT DOCUMENTS

| WO | WO /2012/165200 | * | 6/2012 | .................... 455/444 |
| WO | WO /2012/105766 | * | 8/2012 | ................. 455/452.1 |
| WO | WO /2012/128565 | * | 9/2012 | .................... 370/241 |

OTHER PUBLICATIONS

U.S. Appl. No. 14/356,344, filed Sep. 2014, Einhaus et al.*

* cited by examiner

*Primary Examiner* — Christine Duong
(74) *Attorney, Agent, or Firm* — Birch, Stewart, Kolasch & Birch, LLP

(57) ABSTRACT

A method for an eNB to control inter-cell interference in a wireless communication system includes receiving information on a plurality of time-domain interference patterns corresponding to sub-frequency-domain interference control information on a plurality of sub-frequency domains constituting a system frequency domain, the plurality of time-domain interference control patterns indicating interference control for subframes of the plurality of sub-frequency domains, and transmitting, to a UE, scheduling information about the UE based on information on at least one of the plurality of time-domain interference control patterns, wherein each of the plurality of time-domain interference control patterns is configured to have more subframes for which transmission power restriction is set (referred to as "transmission power-restricted subframes" hereinafter) as an inter-cell interference level indicated by the sub-frequency-domain interference control information increases.

12 Claims, 8 Drawing Sheets

FIG. 5

| subframe | SF #n | SF #n+1 | SF #n+2 | SF #n+3 | SF #n+4 | SF #n+5 | SF #n+6 | SF #n+7 | SF #n+8 | SF #n+9 |
|---|---|---|---|---|---|---|---|---|---|---|
| Time-domain ICIC pattern 1 (if RNTP=0) | 1 | 0 | 0 | 0 | 1 | 0 | 0 | 0 | 1 | 0 |
| Time-domain ICIC pattern 2 (if RNTP=1) | 1 | 1 | 0 | 0 | 1 | 1 | 0 | 0 | 1 | 1 |

INTERFERENCE CONTROL METHOD IN WIRELESS COMMUNICATION SYSTEM AND APPARATUS FOR THE SAME

This application claims the benefit of U.S. Provisional Application No. 61/718,710, filed on Oct. 26, 2012, which is hereby incorporated by reference as if fully set forth herein.

BACKGROUND

1. Field

The present invention relates to a method and apparatus for controlling interference in a wireless communication system.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY

Accordingly, the present invention is directed to an inter-cell interference control scheme in a wireless communication system that substantially obviates one or more problems due to limitations and disadvantages of the related art.

The technical problems to be solved by the present invention are not limited to the above technical problems and those skilled in the art may understand other technical problems from the following description.

To achieve the object and other advantages and in accordance with the purpose of the invention, as embodied and broadly described herein, a method for an eNB to control inter-cell interference in a wireless communication system, the method including: receiving information on a plurality of time-domain interference control patterns corresponding to sub-frequency-domain interference control information on a plurality of sub-frequency domains constituting a system frequency band, the plurality of time-domain interference control patterns indicating interference control for subframes of the plurality of sub-frequency domains; and transmitting, to a UE, scheduling information about the UE based on information on at least one of the plurality of time-domain interference control patterns, wherein each of the plurality of time-domain interference control patterns is configured to have more subframes for which transmission power restriction is set (referred to as "transmission power-restricted subframes" hereinafter) as an inter-cell interference level indicated by the sub-frequency-domain interference control information increases.

Preferably, one of the plurality of time-domain interference control patterns may be set as a subset of another time-domain interference control pattern.

Preferably, the plurality of time-domain interference control patterns may be configured such that the number of the transmission power-restricted subframes with the same index indicated by each of the plurality of time-domain interference control pattern is maximized.

Preferably, the information on the plurality of time-domain interference control patterns may be represented as a combined time-domain interference control pattern, wherein information on the combined time-domain interference control pattern corresponds to a pattern-sequence having a predetermined length.

Preferably, the plurality of time-domain interference control patterns may include at least one of an uplink time-domain interference control pattern and a downlink time-domain interference control pattern, the uplink time-domain interference control pattern may be restricted by the downlink time-domain interference control pattern.

Preferably, if a subframe #n of the downlink time-domain interference control pattern is set as the transmission power-restricted subframe, a subframe #n+k of the uplink time-domain interference control pattern may be set as the transmission power-restricted subframe and wherein n and k may be integers greater than 0.

In another aspect of the present invention, provided herein is an eNB for controlling inter-cell interference in a wireless communication system, including: a radio frequency (RF) unit; and a processor configured to control the RF unit, wherein the processor is configured to receive information on a plurality of time-domain interference control patterns corresponding to sub-frequency-domain interference control information on each of a plurality of sub-frequency domains constituting a system frequency band and to transmit scheduling information about a UE based on information on at least one of the plurality of time-domain interference control patterns to the UE, the plurality of time-domain interference control patterns indicating interference control for subframes of the plurality of sub-frequency domains, wherein each of the plurality of time-domain interference control pattern may be configured to have more subframes for which transmission power restriction is set (referred to as "transmission power-restricted subframes" hereinafter) as an inter-cell interference level indicated by the sub-frequency-domain interference control information increases.

Preferably, one of the plurality of time-domain interference control patterns may be set as a subset of another time-domain interference control pattern.

Preferably, the plurality of time-domain interference control patterns may be set such that the number of the transmission power-restricted subframes with the same index indicated by each of the plurality of time-domain interference control pattern is maximized.

Preferably, the information on the plurality of time-domain interference control patterns may be represented as a combined time-domain interference control pattern, wherein information on the combined time-domain interference control pattern corresponds to a pattern-sequence having a predetermined length.

Preferably, the plurality of time-domain interference control patterns may include at least one of an uplink time-domain interference control pattern and a downlink time-domain interference control pattern and the uplink time-domain interference control pattern may be restricted by the downlink time-domain interference control pattern.

Preferably, if a subframe #n of the downlink time-domain interference control pattern is set as the transmission power-restricted subframe, a subframe #n+k of the uplink time-domain interference control pattern may be set as the transmission power-restricted subframe and wherein n and k may be integers greater than 0.

In another aspect of the present invention, provided herein is an eNB for controlling inter-cell interference in a wireless communication system, including: an RF unit; and a processor configured to control the RF unit, wherein the processor is configured to transmit, to a neighboring eNB, information on a plurality of time-domain interference control patterns corresponding to sub-frequency-domain interference control information on each of a plurality of sub-frequency domains constituting a system frequency band, wherein the plurality of time-domain interference control patterns may indicate interference control for subframes of the plurality of sub-frequency domains, wherein at least one of the plurality of time-domain interference control patterns is used to schedule for a UE served by the neighboring eNB, wherein each of the plurality of time-domain interference control pattern is configured to have more subframes for which transmission power restriction is set (referred to as "transmission power-restricted subframes" hereinafter) as an inter-cell interference level indicated by the sub-frequency-domain interference control information increases.

Preferably, one of the plurality of time-domain interference control patterns may be set as a subset of another time-domain interference control pattern.

Preferably, the plurality of time-domain interference control patterns may be set such that the number of subframes having the same index, set as the transmit power-restricted subframe, is maximized for each time-domain interference control pattern.

Preferably, the information on the plurality of time-domain interference control patterns may be represented as a combined time-domain interference control pattern, wherein information on the combined time-domain interference control pattern corresponds to a pattern-sequence having a predetermined length.

Preferably, the plurality of time-domain interference control patterns may include at least one of an uplink time-domain interference control pattern and a downlink time-domain interference control pattern, and the uplink time-domain interference control pattern may be restricted by the downlink time-domain interference control pattern.

Preferably, if a subframe #n of the downlink time-domain interference control pattern is set as the transmission power-restricted subframe, a subframe #n+k of the uplink time-domain interference control pattern may be set as the transmission power-restricted subframe and wherein n and k may be integers greater than 0.

The above description corresponds to part of embodiments of the present invention and various embodiments reflecting technical characteristics of the present invention are derived and understood by those skilled in the art on the basis of the following detailed description of the present invention.

According to embodiments of the present invention, inter-cell interference can be controlled or reduced in a wireless communication system.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 5 illustrates time-domain inter-cell interference coordination (ICIC) patterns based on a frequency-domain ICIC control value according to an embodiment of the present invention;

DETAILED DESCRIPTION

Figure 1:
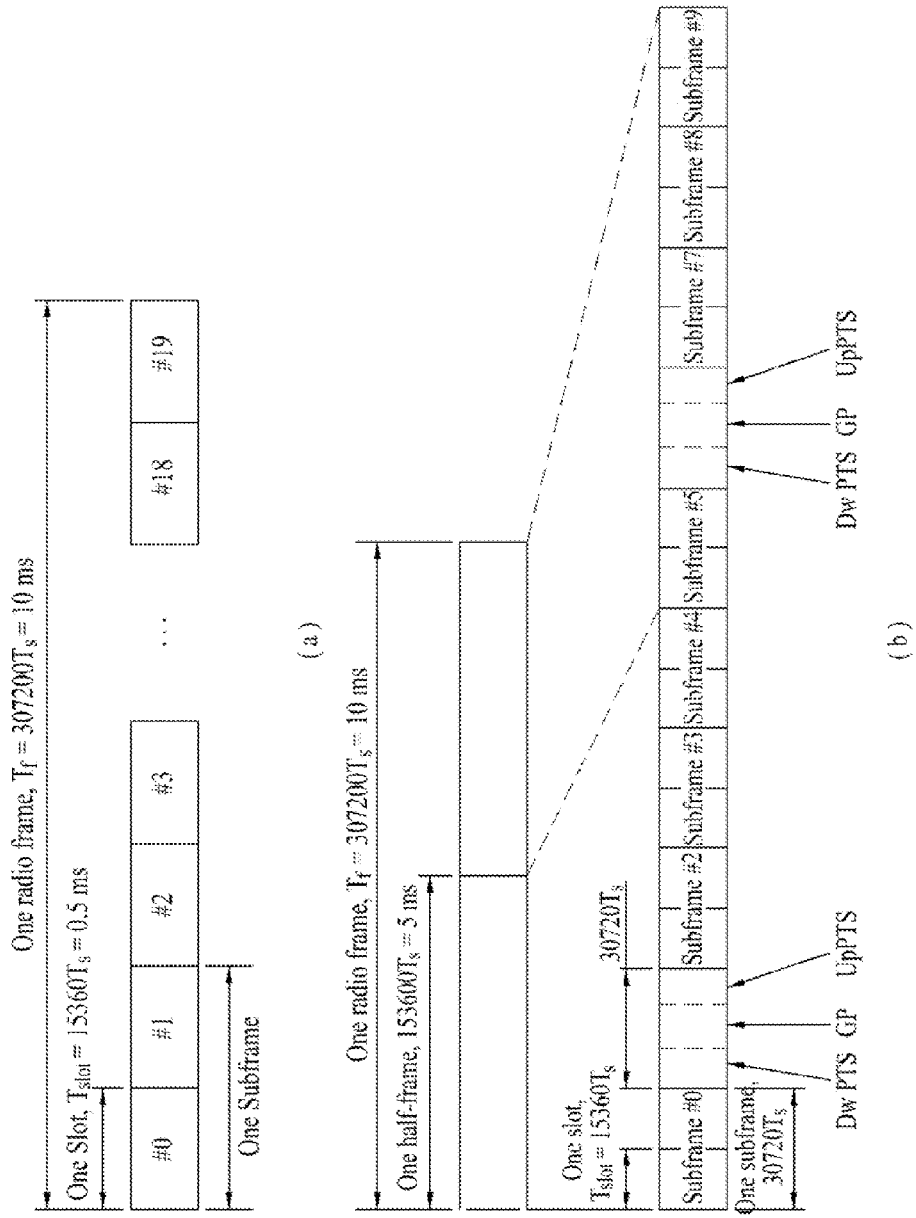
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel; refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
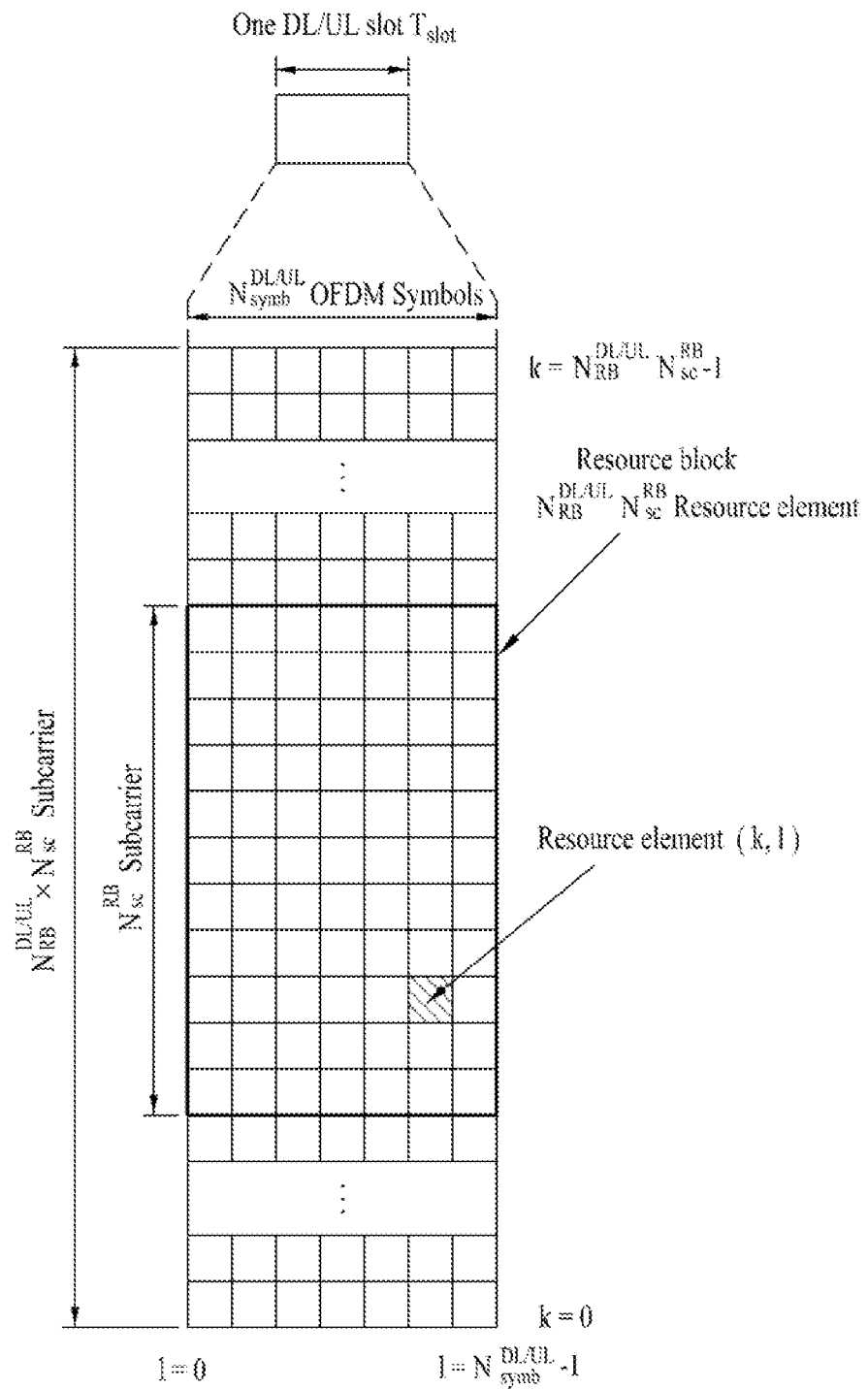
FIG. 2 illustrates an exemplary downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
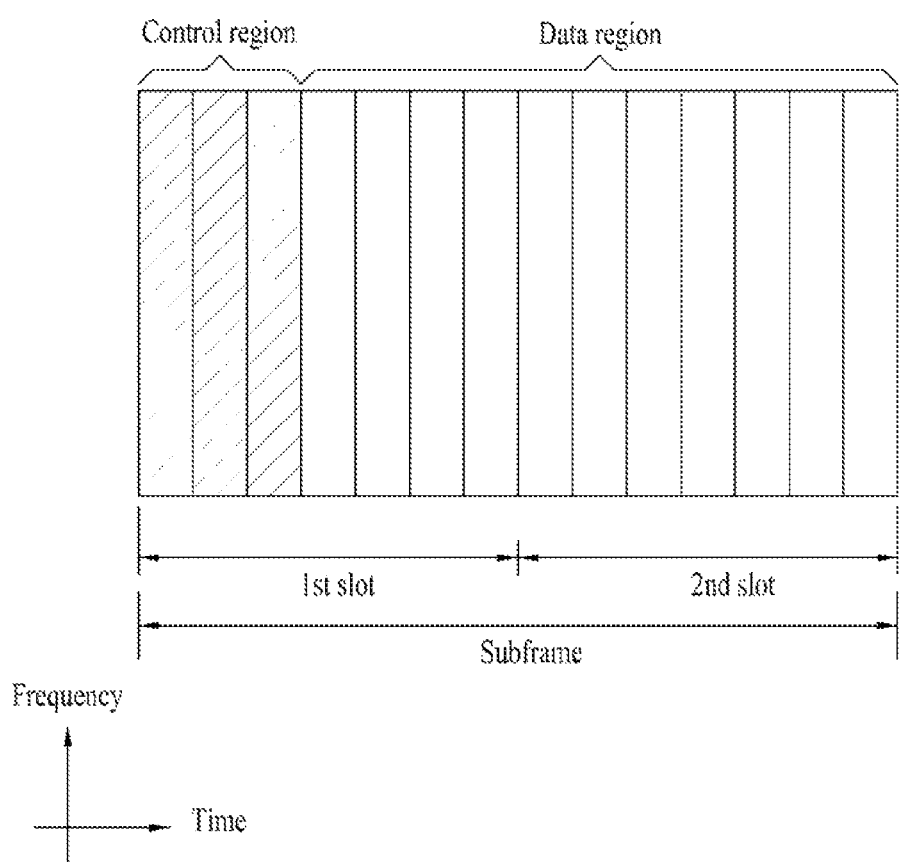
FIG. 3 illustrates a DL subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
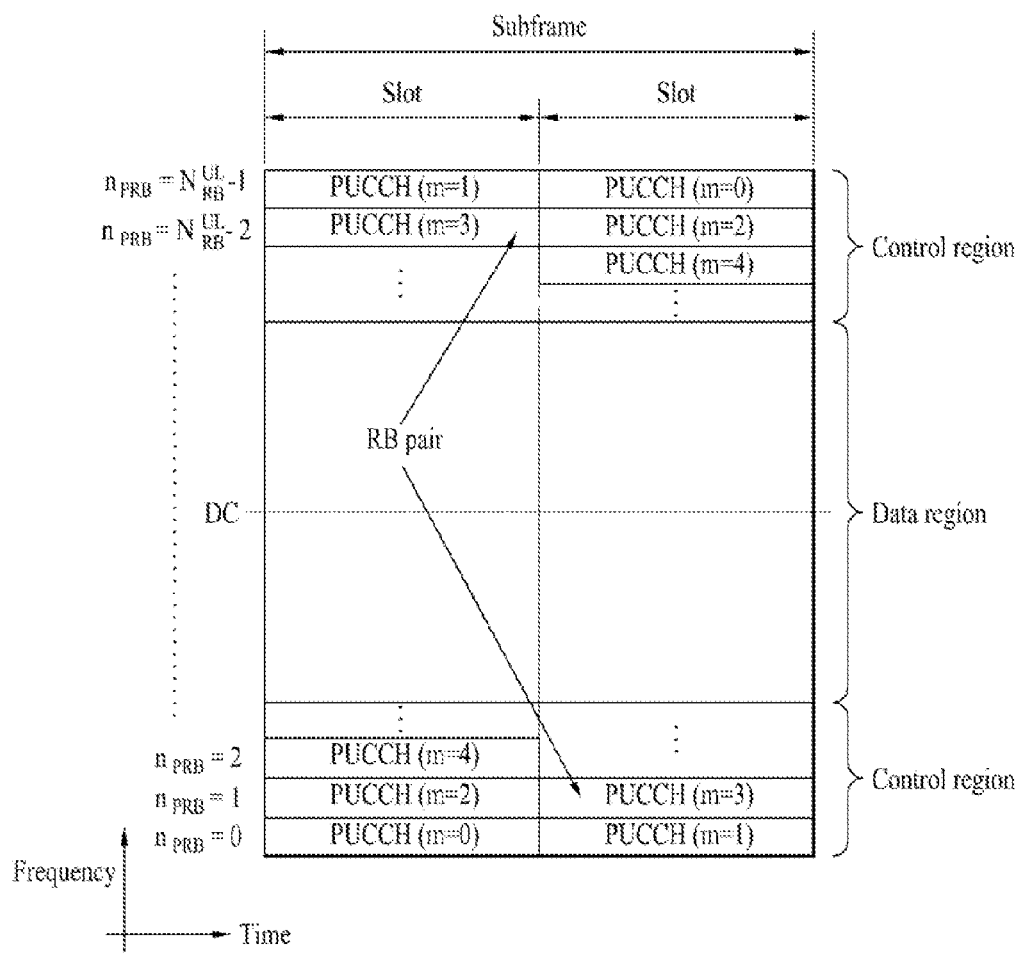
FIG. 4 illustrates a UL subframe structure used in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE/LTE-A.

TABLE 2

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2 PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

A scheme for performing transmission according to a predetermined time pattern in order to mitigate interference between neighboring cells (or eNBs) is standardized focusing on an almost blank subframe (ABS) in 3GPP LTE. According to the ABS based scheme, an aggressor cell, which may cause interference in communication of neighboring cells, can previously transmit an ABS pattern corresponding to a transmission pattern thereof to victim cells, the victim cells can mitigate interference from the aggressor cell by actively using subframes designated as ABSs by the aggressor cell for communication with UEs linked thereto, and cell detection performance and cell maintenance performance of the UEs linked to the victim cells can be improved.

The ABS will now be described in more detail.

A description will be given of ABS related signaling through an X2 interface used for communication between eNBs. To make good use of the ABS, an eNB sets restricted measurement for a UE and transmits two different ABS based measurement sets to the UE for restricted measurement. That is, upon reception of an ABS pattern of a neighboring cell, particularly, an aggressor cell through the X2 interface, the eNB configures measurement sets for the UE linked thereto on the basis of an ABS pattern thereof. In 3GPP LTE, a UE needs to measure a CRS in all subframes in order to select an MCS, RI and PMI. However, when the neighboring cell sets an ABS and does not transmit a downlink signal or transmits the downlink signal with reduced power in the corresponding subframe, as described above, the UE needs to perform subframe-specific measurement since interference depends on the ABS pattern. To achieve this, the eNB instructs a specific UE to measure a specific subframe and the UE performs subframe-specific measurement. This is called restricted measurement. For this operation, when a specific cell sets some subframes as ABSs, corresponding information needs to be transmitted through X2 interface between eNBs. ABS signaling defined in 3GPP LTE-A includes ABS information and ABS state.

The ABS information is shown in FIG. 3. The ABS information represents a subframe to be used as an ABS as a bitmap and corresponds to a 40-bit bitmap in FDD and a maximum 70-bit bitmap depending on UL-DL configuration in TDD. In the case of FDD, 40 bits represent 40 subframes, a bit value 1 indicates an ABS and 0 indicates a non-ABS. When restricted measurement is set for a UE, the number of CRS antenna ports of a corresponding cell is signaled to the UE for CRS measurement. A measurement subset is a subset of ABS Pattern Info and corresponds to a recommended kind of restricted measurement set for setting restricted measurement for a UE. The measurement subset is represented as a 40-bit bitmap in FDD and as a maximum 70-bit bitmap in TDD.

TABLE 3

| IE/Group Name | Presence | Range | IE type and reference | Semantics description |
| --- | --- | --- | --- | --- |
| CHOICE ABS Information | M | — | — | |
| >FDD | | | — | — |
| >>ABS Pattern Info | M | | BIT STRING (SIZE(40)) | Each position in the bitmap represents a DL subframe, for which "1" indicates 'ABS' and "0" indicates 'non-ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, ...) | P (number of antenna ports for cell-specific reference signals) |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 ... 70, ...) | Each position in the bitmap represents a DL subframe for which "1" indicates 'ABS' |

TABLE 3-continued

| IE/Group Name | Presence | Range | IE type and reference | Semantics description |
|---|---|---|---|---|
| | | | | and "0" indicates 'non-ABS'. The maximum number of subframes depends on UL/DL subframe configuration. The maximum number of subframes is 20 for UL/DL subframe configurations 1~5; 60 for UL/DL subframe configuration 6; 70 for UL/DL subframe configuration 0. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 4 shows ABS status IE. The ABS status IE is used to assist an eNB in determining whether or not to change the ABS pattern thereof. Usable ABS Pattern Info is bitmap information corresponding to a subset of ABS Pattern Info and indicates whether a subframe designated as an ABS has been successfully used for interference control or not. DL ABS status represents the ratio of the number of RBs allocated to a UE, which need to be protected through an ABS, to the number of DL RBs scheduled in a subframe indicated by Usable ABS Pattern Info and corresponds to information indicating whether the ABS has been successfully used for the purpose thereof in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS information | M | | — | — |
| >FDD | | | — | — |
| >>Usable ABS Pattern Info | M | | BIT STRING (SIZE(40)) | Each position in the bitmap represents a subframe, for which "1" indicates 'ABS that has |

TABLE 4-continued

| IE/Group Name | Presence | Range | IE type and reference | Semantics description |
|---|---|---|---|---|
| | | | | been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 . . . 70) | Each position in the bitmap represents a subframe, for which "1" indicates 'ABS that has been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern Info IE conveyed in the LOAD INFORMATION message from the eNB1. |

As described above, a measurement subset corresponding to a subset of an ABS pattern is a subframe statically used as an ABS and an eNB can determine whether other subframes included in the ABS pattern can be used as ABSs according to traffic load.

The following table shows invoke an indication IE. Invoke indication can be used when a specific eNB requests information of a specific type from a neighboring eNB. When the neighboring eNB performs ABS operation, invoke information can be used to request the neighboring eNB to provide ABS information on an ABS pattern set therefor.

TABLE 5

| IE/Group Name | Presence | Range | IE type and reference | Semantics description |
|---|---|---|---|---|
| Invoke Indication | M | | ENUMERATED (ABS Information, . . . ) | — |

As described above, when a plurality of cells in an interfering relationship predetermines transmission patterns thereof through co-scheduling, a UE located at a position where the UE can communicate with all the cells can communicate with a specific cell at the time when the specific cell can perform transmission and reception. Accordingly, the UE can achieve communication with the plurality of cells by arranging transmission/reception times thereof according to the transmission patterns of the cells. Here, the UE can perform communication with the plurality of cells by pre-establishing connection with the cells such that transmission/reception times with respect to the cells do not overlap.

The above-described ABS is a solution to inter-cell interference, which is applicable in the time domain. A description will be given of a solution to inter-cell interference, which can be applied in the frequency domain as well as the time domain.

Inter-cell interference coordination for frequency resources will be described hereinafter. In 3GPP LTE (Rel-8), an allocated frequency domain can be divided into one or more sub-frequency domains (e.g. PRBs) and the following indicators with respect to each sub-frequency domain can be exchanged between cells.

RNTP (relative narrowband transmission power): RNTP is an indicator that indicates downlink transmit power used by a cell transmitting an ICIC message in a corresponding sub-frequency domain. For example, when the RNTP field is set to 0 in a specific sub-frequency domain, this means that downlink transmit power does not exceed a threshold. When the RNTP field is set to 1, this means that downlink transmit power cannot be allotted.

UL IOI (uplink interference overload indication): UL IOI is an indicator that indicates the quantity of uplink interference that a cell transmitting an ICIC message suffers in a corresponding sub-frequency domain. For example, when the UL IOI field is set to a high value in a specific sub-frequency domain, this means that the cell suffers severe uplink interference in the sub-frequency domain. In this case, a cell that has received the ICIC message can schedule a UE using low uplink transmit power from among UEs served thereby in the sub-frequency domain in which the UL IOI field indicates high interference in order to mitigate interference applied to the cell transmitting the ICIC message.

UL HII (uplink high interference indication): UL HII is an indicator that indicates uplink interference sensitivity with respect to a corresponding sub-frequency domain from a cell transmitting an ICIC message. For example, when the UL HIT field is set to 1 in a specific sub-frequency domain, this means that there is possibility that the cell transmitting the ICIC message schedules a UE using high uplink transmit power in the corresponding sub-frequency domain. On the contrary, if the UL HIT field is set to 0 in a specific sub-frequency domain, this means that there is possibility that the cell transmitting the ICIC message schedules a UE using low uplink transmit power in the corresponding sub-frequency domain. In this case, a cell that has received the ICIC message can schedule UEs that can successfully operate even under high interference in a sub-frequency domain in which UL HII is set to 1 while preferentially using a sub-frequency domain in which UL HII is set to 0 for UE scheduling in order to avoid interference from the cell transmitting the ICIC message.

As described above, the scheme of performing transmission according to a predetermined time pattern to mitigate interference between neighboring cells is referred to as ABS scheme in 3GPP LTE. According to the ABS scheme, an aggressor cell that may cause interference in communication of a neighboring cell can previously transmit an ABS pattern corresponding to a transmission pattern thereof to victim cells in which interference is generated and the victim cells can mitigate interference from the aggressor cell by actively using subframes designated by the aggressor cell as ABSs for communication with UEs linked thereto. In addition, cell detection performance of UEs that attempt to access the victim cells to communicate with the same and cell maintenance performance of UEs linked to the victim cells can be improved.

In 3GPP LTE, RNTP is defined on DL and HII is defined on UL in order to signal transmit power level per physical resource block (PRB) to a neighboring cell for frequency-domain ICIC.

In a 3GPP LTE system in which RNTP and HII corresponding to frequency-domain ICIC and ABS corresponding to time-domain ICCI coexist, how a neighboring eNB estimates an interference level of a specific PRB and schedules UEs linked thereto becomes an issue because frequency-domain ICIC and time-domain ICIC are simultaneously used and related control information is transmitted to the neighboring eNB. For example, when RNTP is set to 1, a method of interpreting an interference level of a specific PRB disposed in a subframe designated as an ABS is not determined. That is, when both time-domain ICIC control information and frequency-domain ICIC control information are present, an ICIC control scheme for specific sub-frequency domain and/or a specific sub-time domain needs to be defined.

A) Designation of Plural Time-Domain ICIC Patterns Based on Frequency-Domain ICIC Control Value In one embodiment, the present invention proposes a method of defining a time-domain ICIC pattern depending on RNTP and HII values. According to this method, a time-domain ICIC pattern in which the percentage of ABSs is high is applied to a frequency resource which is expected to suffer severe interference and has an RNTP value of 1 on DL and an HIT value of 1 on UL, whereas a time-domain ICIC pattern in which the percentage of ABSs is low is applied to a frequency resource which is expected to suffer low interference and has an RNTP value of 0 on DL and an HII value of 0 on UL. That is, time-domain ICIC at an appropriate level can be applied to each frequency resource according to expected interference level of each frequency resource.

According to the above-described method, it is possible to clearly recognize an expected interference level of a radio resource when frequency-domain ICIC and time-domain ICIC are simultaneously applied, to efficiently control inter-cell interference using appropriate time-domain ICIC according to frequency-domain ICIC values such as RNTP and HII and to adaptively use system resources according to channel state.

The time-domain ICIC scheme of 3GPP LTE designates one time-domain ICIC pattern and applies the same to a specific frequency domain used by the corresponding LTE system for a predetermined period. That is, in the case of FDD of LTE, an ABS pattern corresponding to a time-domain ICIC pattern is designated to set a transmit power level for 40 subframes in a specific available LTE frequency band for 40 ms.

In one embodiment, the present invention proposes a method of designating a plurality of time-domain ICIC patterns based on frequency-domain ICIC control information (or control values) and applying a time-domain ICIC pattern suitable to an RNTP value of each unit frequency section corresponding to one PRB in the frequency domain.

In 3GPP LTE, '0' and '1' can be designated as RNTP values. Downlink transmit power in an estimated unit frequency section is set to a level that does not exceed a transmit power level determined in the system if RNTP corresponds to "0", whereas the transmit power level is not restricted, that is, the estimated downlink transmit power exceeds the transmit power level determined in the system if RNTP corresponds to "1".

While the present invention considers a case in which there are two frequency-domain ICIC values including RNTP with regard to 3GPP LTE, the present invention can be extended and applied to a case in which two or more frequency-domain ICIC control values can be designated.

In addition, while the method of setting a plurality of time-domain ICIC patterns according to RNTP that designates an estimated transmit power level of a DL frequency domain is described in the specification, the proposed method can be equally applied to HII related to a UL frequency domain and a parameter indicating a transmit power level per frequency resource of the frequency domain.

FIG. 5 illustrates an example of designating a time-domain ICIC pattern based on RNTP of an LTE system on downlink. The time-domain ICIC pattern designates a transmit power level on a subframe basis in the time domain. In FIG. 5, transmission is performed with DL transmit power corresponding to DL transmit power in a normal state in the corresponding network, in periods corresponding to "0" in a bitmap, whereas data is transmitted with reduced transmit power or is not transmitted in periods corresponding to "1" in the bitmap. In a time-domain ICIC pattern corresponding to an RNTP value of "1" which represents that severe interference is applied to a neighboring cell, data is transmitted with low transmit power or the number of periods corresponding to '1' which represents a period in which data is not transmitted in the bitmap is set to larger than that in a time-domain ICIC pattern corresponding to an RNTP value of '0'.

In another embodiment of the present invention, when a plurality of time-domain ICIC patterns is designated based on frequency-domain ICIC control value, the plurality of patterns can be represented as a combined time-domain ICIC pattern. Here, a combined time-domain ICIC pattern value for each subframe indicates a transmit power level of PRBs in each subframe for each frequency-domain ICIC control value.

For example, a time-domain ICIC pattern value designated per subframe when frequency-domain ICIC control values correspond to two values or states like RNTP in 3GPP LTE can be represented as one of 4 state values, '00', '01', '10' and '11' as shown in the following table.

TABLE 6

| Combined time-domain ICIC pattern value per subframe | Meaning |
| --- | --- |
| 0 0 | if RNTP = 0, time-domain ICIC pattern = 0 |
|  | if RNTP = 1, time-domain ICIC pattern = 0 |
| 0 1 | if RNTP = 0, time-domain ICIC pattern = 0 |
|  | if RNTP = 1, time-domain ICIC pattern = 1 |
| 1 0 | if RNTP = 0, time-domain ICIC pattern = 1 |
|  | if RNTP = 1, time-domain ICIC pattern = 0 |
| 1 1 | if RNTP = 0, time-domain ICIC pattern = 1 |
|  | if RNTP = 1, time-domain ICIC pattern = 1 |

Referring to Table 6, in the case of a subframe in which the combined time-domain ICIC pattern value is set to '01', a time-domain ICIC pattern value of '0' is set for a PRB corresponding to an RNTP value of 0 such that data is transmitted with normal DL transmit power of the system in the corresponding PRB and a time-domain ICIC pattern value of '1' is set for a PRB corresponding to an RNTP value of 1 such that data is not transmitted or is transmitted with transmit power lower than a reference DL transmit power level determined in the system in the corresponding PRB.

Figure 6:
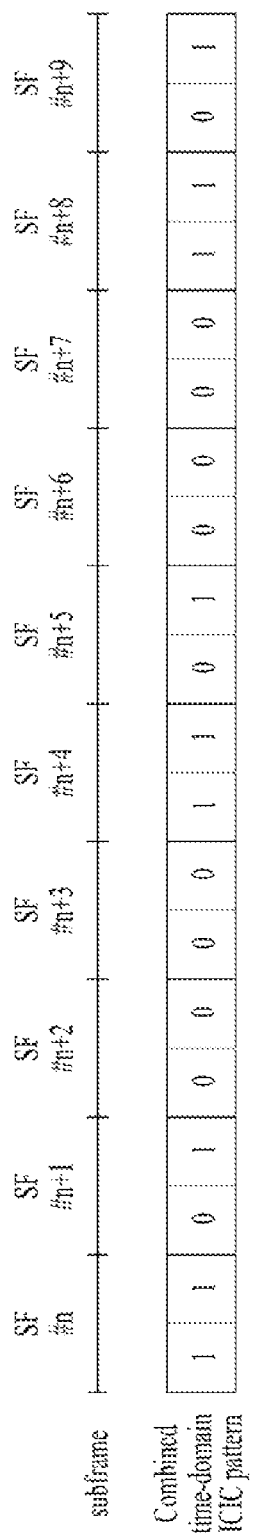
FIG. 6 illustrates a combined time-domain ICIC pattern based on a frequency-domain ICIC control value according to an embodiment of the present invention.

FIG. 6 illustrates a combined time-domain ICIC pattern based on frequency-domain ICIC control values according to an embodiment of the present invention. FIG. 6 shows a result obtained by arranging the time-domain ICIC patterns shown in FIG. 5 on the basis of Table 6.

Figure 7:
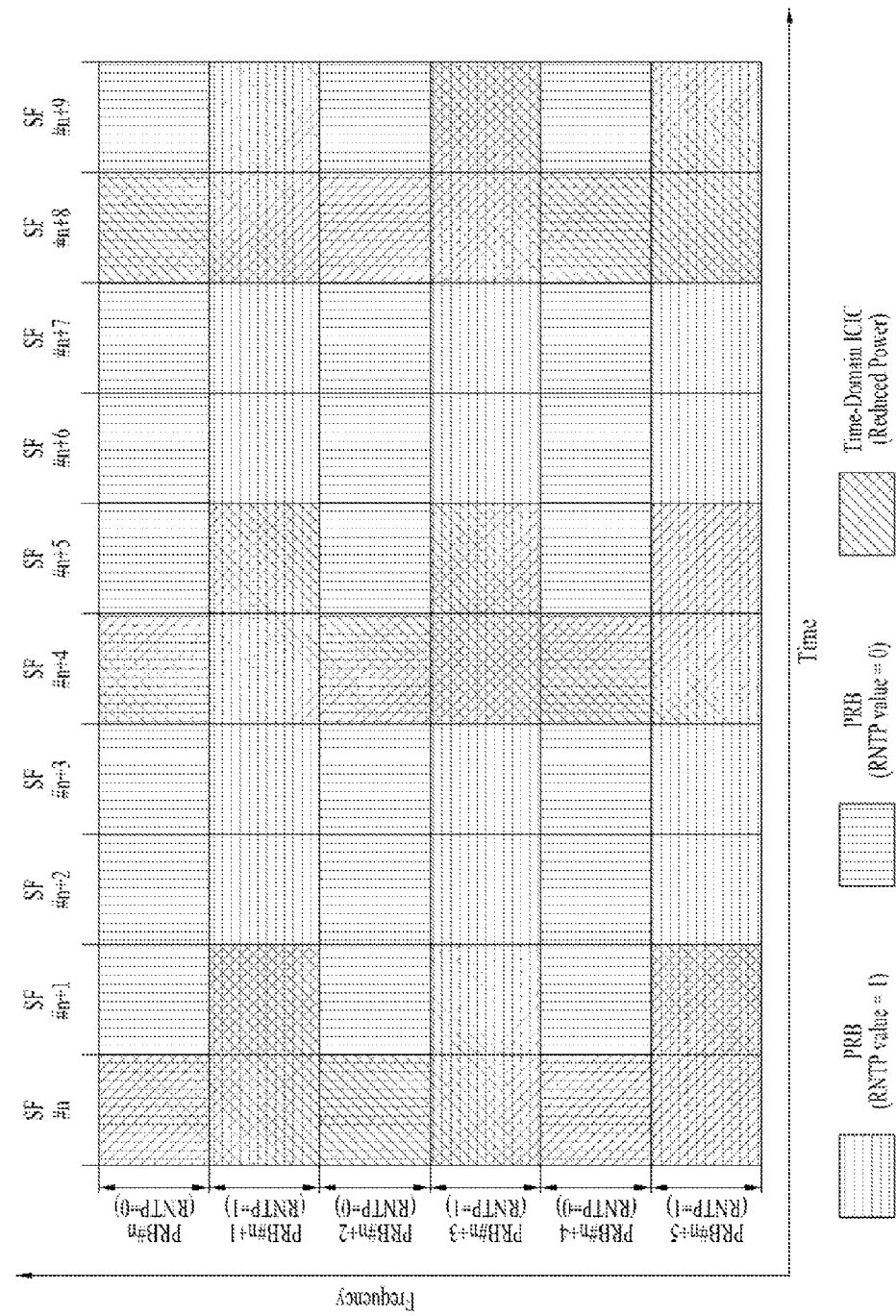
FIG. 7 illustrates a time-domain ICIC pattern based on a frequency-domain ICIC control value according to an embodiment of the present invention.

FIG. 7 illustrates an exemplary application of a plurality of time-domain ICIC patterns based on frequency-domain ICIC control values.

FIG. 7 illustrates an example in which an RNTP value of 0 is set for odd-numbered PRBs and an RNTP value of 1 is set for even-numbered PRBs in the frequency domain (n being an odd number). In this case, ABS pattern #1 is applied to the odd-numbered PRBs and ABS pattern #2 is applied to the even-numbered PRBs.

In the case of UL of LTE FDD, frequency-domain ICIC can be represented using HII independent from RNTP. However, in the case of time-domain ICIC, a UL time-domain ICIC pattern depends on a DL time-domain ICIC pattern. That is, if an n-th subframe of DL is set as an ABS in which data is not transmitted according to time-domain ICIC, an (n+k)-th (e.g. k=4) UL subframe can be set as an ABS because uplink grant for the (n+k)-th subframe cannot be transmitted in the n-th subframe. Accordingly, when a plurality of time-domain ICIC patterns for UL is determined according to HIT value, a plurality of time-domain ICIC pattern values for DL is all set to '1' such that a plurality of time-domain ICIC pattern values for UL all need to be set to '1' for a k-th UL subframe in a DL subframe set as an ABS in which data is not transmitted.

B) Arrangement of Time-Domain ICIC Pattern Values Based on Frequency-Domain ICIC Value and Subframe Analysis When a plurality of time-domain ICIC patterns is set based on frequency-domain ICIC values according to an embodiment of the present invention, values of the time-domain ICIC patterns need to be arranged because a victim cell can receive control information such as a PDCCH without interference when the number of PRBs in which data is transmitted with reduced power or is not transmitted is maximized with respect to all PRBs of a subframe. That is, the time-domain ICIC patterns may be configured such that the number of the reduced power-subframes with the same index indicated by the time-domain ICIC patterns is maximized. Preferably, subframes with at least one of indices indicated by the time-domain ICIC patterns may be set to be transmitted in the reduced power.

Further, to achieve this, an ABS pattern corresponding to an RNTP value of 0 can be a subset of an ABS pattern corresponding to an RNTP value of 1 as in time-domain ICIC pattern 1 and time-domain ICIC pattern 2 of FIG. 5.

In FIG. 7, different numbers of PRBs to which time-domain ICIC is applied are set for respective subframes. In the case of subframe #n, time-domain ICIC is applied to all PRBs of subframe #n such that subframe #n is set as an ABS of 3GPP LTE in which data is transmitted with reduced power or is not transmitted. In the case of subframe #n+1, time-domain ICIC is applied to some PRBs thereof and time-domain ICIC is not applied to the other PRBs. Subframes #n+2 and #n+3 are set as a normal subframe in which time-domain ICIC is not applied to all PRBs thereof.

A subframe of a neighboring eNB that has received ICIC related control information can be analyzed depending on the above-described three types of time-domain ICIC application forms. That is, a subframe (e.g. subframes #n, #n+4 and #n+8 of FIG. 7) is recognized as an ABS when time-domain ICIC is applied to all PRBs thereof, and thus the neighboring eNB can use the subframe to schedule a UE served thereby or to transmit data and system information. In the case of a subframe (e.g. subframes #n+1, #n+5 and #n+9 of FIG. 7) in which time-domain ICIC is applied to only some PRBs, the neighboring eNB can use the subframe in such a manner that the PRBs to which time-domain ICIC is applied are used to schedule a UE served by the eNB or to transmit/receive data.

From a different viewpoint, a subframe of the neighboring eNB that has received ICIC related control information can be analyzed depending on the above-described three types of time-domain ICIC.

That is, a subframe (e.g. subframes #n, #n+4 and #n+8 of FIG. 7) is recognized as an ABS when time-domain ICIC is applied to all PRBs thereof, and thus the neighboring eNB can use the subframe for data transmission and control information transmission for a UE located at a cell edge, which is expected to have a poor channel state. In the case of a subframe in which time-domain ICIC is applied to only some PRBs thereof, the neighboring eNB can use the PRBs to which time-domain ICIC is applied for data and control information transmission for the UE located at the cell edge.

Figure 8:
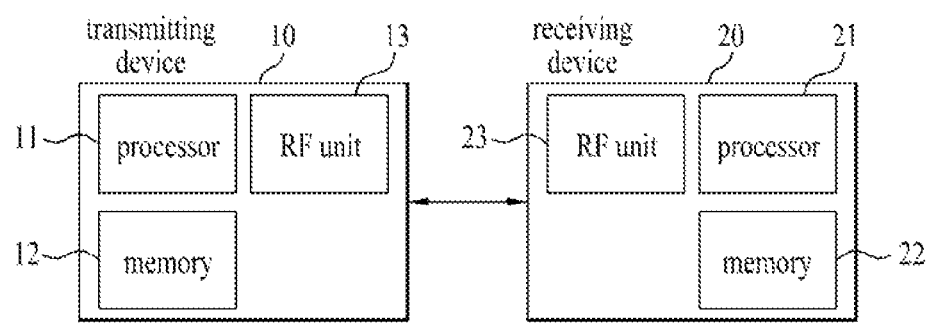
FIG. 8 is a block diagram of an apparatus for implementing embodiments of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention can be used for wireless communication systems such as a UE, a relay, an eNB, etc.

What is claimed is:

1. A method for an evolved Node B (eNB) to control inter-cell interference in a wireless communication system, the method comprising:
   receiving time-domain interference control patterns which are respectively set based on a corresponding sub-frequency-domain interference control value,
   wherein the corresponding sub-frequency-domain interference control value indicates a downlink transmission power level or an uplink inter-cell interference level of a corresponding one of a plurality of sub-frequency domains; and
   transmitting, to a user equipment (UE), scheduling information for the UE, the scheduling information being based on information on at least one of the time-domain interference control patterns,
   wherein one of the time-domain interference control patterns is set as a subset of another time-domain interference control pattern, and
   wherein the time-domain interference control patterns are configured such that a number of transmission power-restricted subframes with a specific index indicated by each of the time-domain interference control patterns is maximized.

2. The method according to claim 1, wherein the time-domain interference control patterns are represented as a combined time-domain interference control pattern, and
   wherein information on the combined time-domain interference control pattern corresponds to a pattern-sequence having a predetermined length.

3. The method according to claim 1, wherein the time-domain interference control patterns include at least one of an uplink time-domain interference control pattern and a downlink time-domain interference control pattern, and
   wherein the uplink time-domain interference control pattern is restricted by the downlink time-domain interference control pattern.

4. The method according to claim 3, wherein, if a subframe #n of the downlink time-domain interference control pattern is set as the transmission power-restricted subframe, a subframe #n+k of the uplink time-domain interference control pattern is set as the transmission power-restricted subframe, and wherein n and k are integers greater than 0.

5. An evolved Node B (eNB) for controlling inter-cell interference in a wireless communication system, the eNB comprising:

a radio frequency (RF) unit; and a processor configured to control the RF unit, wherein the processor is further configured to receive time-domain interference control patterns which are respectively set based on a corresponding sub-frequency-domain interference control value, wherein the corresponding sub-frequency-domain interference control value indicates a downlink transmission power level or an uplink inter-cell interference level of a corresponding one of a plurality of sub-frequency domains and to transmit scheduling information about a user equipment (UE) based on information on at least one of the plurality of time-domain interference control patterns to the UE, wherein the time-domain interference control patterns indicate interference control for subframes belong to a respective one of the plurality of sub-frequency domains, wherein one of the time-domain interference control patterns is set as a subset of another time-domain interference control pattern, and wherein the time-domain interference control patterns are configured such that a number of transmission power-restricted subframes with a specific index indicated by each of the time-domain interference control patterns is maximized.

6. The eNB according to claim 5, wherein the time-domain interference control patterns are represented as a combined time-domain interference control pattern, and wherein information on the combined time-domain interference control pattern corresponds to a pattern-sequence having a predetermined length.

7. The eNB according to claim 5, wherein the time-domain interference control patterns include at least one of an uplink time-domain interference control pattern and a downlink time-domain interference control pattern, and wherein the uplink time-domain interference control pattern is restricted by the downlink time-domain interference control pattern.

8. The eNB according to claim 7, wherein, if a subframe #n of the downlink time-domain interference control pattern is set as the transmission power-restricted subframe, a subframe #n+k of the uplink time-domain interference control pattern is set as the transmission power-restricted subframe, and wherein n and k are integers greater than 0.

9. An evolved Node B (eNB) for controlling inter-cell interference in a wireless communication system, the eNB comprising:

a radio frequency (RF) unit; and a processor configured to control the RF unit, wherein the processor is further configured to transmit, to a neighboring eNB, a time-domain interference control patterns which are respectively set based on a corresponding sub-frequency-domain interference control value, wherein the corresponding sub-frequency-domain interference control value indicates a downlink transmission power level or an uplink inter-cell interference level of a corresponding one of a plurality of sub-frequency domains, wherein at least one of the time-domain interference control patterns is used to schedule for a user equipment (UE) served by the neighboring eNB, wherein one of the time-domain interference control patterns is set as a subset of another time-domain interference control pattern, and wherein the time-domain interference control patterns are configured such that a number of transmission power-restricted subframes with a specific index indicated by each of the time-domain interference control patterns is maximized.

10. The eNB according to claim 9, wherein the time-domain interference control patterns are represented as a combined time-domain interference control pattern, and wherein information on the combined time-domain interference control pattern corresponds to a pattern-sequence having a predetermined length.

11. The eNB according to claim 9, wherein the time-domain interference control patterns include at least one of an uplink time-domain interference control pattern and a downlink time-domain interference control pattern, and wherein the uplink time-domain interference control pattern is restricted by the downlink time-domain interference control pattern.

12. The eNB according to claim 11, wherein, if a subframe #n of the downlink time-domain interference control pattern is set as the transmission power-restricted subframe, a subframe #n+k of the uplink time-domain interference control pattern is set as the transmission power-restricted subframe, and wherein n and k are integers greater than 0.

* * * * *